No. 890,791. PATENTED JUNE 16, 1908.
G. W. PARSONS.
TRENCH EXCAVATOR.
APPLICATION FILED MAR. 5, 1906.

Attest:
A. A. Feibrock,
L. H. Orwig.

Inventor G. W. Parsons,
by R. C. Orwig Atty.

No. 890,791. PATENTED JUNE 16, 1908.
G. W. PARSONS.
TRENCH EXCAVATOR.
APPLICATION FILED MAR. 5, 1906.
8 SHEETS—SHEET 3.

No. 890,791. PATENTED JUNE 16, 1908.
G. W. PARSONS.
TRENCH EXCAVATOR.
APPLICATION FILED MAR. 5, 1906.

Attest:
L. Heibrock.
L. H. Orwig.

Inventor: G. W. Parsons,
by R. G. Orwig, Atty.

No. 890,791. PATENTED JUNE 16, 1908.
G. W. PARSONS.
TRENCH EXCAVATOR.
APPLICATION FILED MAR. 5, 1906.

Attest:
H. Heibrock.
L. H. Orwig.

Inventor G. W. Parsons,
by R. G. Orwig, Atty.

No. 890,791.

PATENTED JUNE 16, 1908.

G. W. PARSONS.
TRENCH EXCAVATOR.
APPLICATION FILED MAR. 5, 1906.

No. 890,791. PATENTED JUNE 16, 1908.
G. W. PARSONS.
TRENCH EXCAVATOR.
APPLICATION FILED MAR. 5, 1906.

No. 890,791. PATENTED JUNE 16, 1908.
G. W. PARSONS.
TRENCH EXCAVATOR.
APPLICATION FILED MAR. 5, 1906.

UNITED STATES PATENT OFFICE.

GEORGE W. PARSONS, OF NEWTON, IOWA, ASSIGNOR TO THE G. W. PARSONS COMPANY, OF NEWTON, IOWA, A CORPORATION OF IOWA.

TRENCH-EXCAVATOR.

No. 890,791.  Specification of Letters Patent.  Patented June 16, 1908.

Application filed March 5, 1906. Serial No. 304,197.

*To all whom it may concern:*

Be it known that I, GEORGE W. PARSONS, a citizen of the United States, residing at Newton, in the county of Jasper and State of Iowa, have invented a new and useful Trench-Excavator, of which the following is a specification.

The object of this invention is to provide an improved trench excavator.

A further object is to provide an improved construction of endless diggers.

A further object is to provide an improved means for carrying and altitudinally adjusting the digger.

A further object is to provide a novel means for mounting an auxiliary digger frame to the machine proper, whereby the digger frame may be tilted relatively to the machine proper.

A further object is to provide an improved steering apparatus for machines of this class.

My invention consists in the construction, arrangement and combination of a motor carrying frame, an auxiliary frame having digging mechanism thereon and the various mechanisms employed to drive, control and adjust the digger and machine proper as illustrated in the accompanying drawings, in which—

Fig. 3 is a rear elevation of the means for tilting the digger frame relative to the tractor. Fig. 13 is an elevation of a conveyer which receives earth from the digger and carries it laterally to discharge.

In the construction of the machine herein described and claimed, I employ a tractor specially designed for excavating trenches, having the means for controlling its operating parts in such relation to a position thereon from which the operator may at all times have sight of the path of the machine's travel and the various mechanisms. And, a digger arranged in a separate frame pivotally mounted on the rear end of the tractor frame, the controlling and adjusting parts of which are disposed on the tractor frame accessible to the operator.

Figure 1:
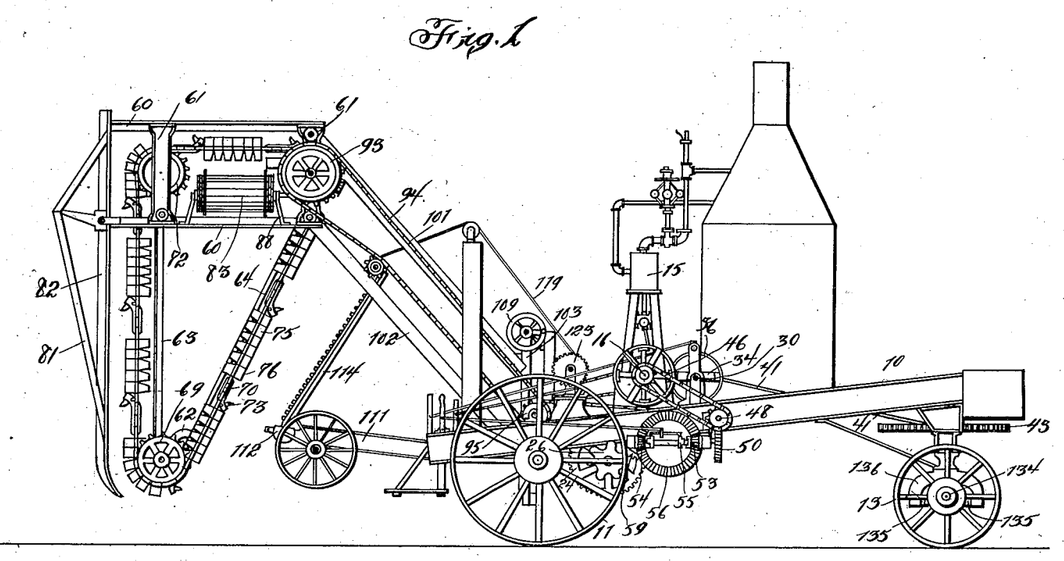
Figure 1 is an elevation of the complete machine.

In the drawings 10 designates the frame of the tractor, 11 and 12 the rear wheels and 13 and 14 the forward wheels thereof. The rear wheels 11 and 12 are in gear with a motor, in this instance two vertical steam engines, such as the one 15 shown in Fig. 1 are employed.

Figure 2:
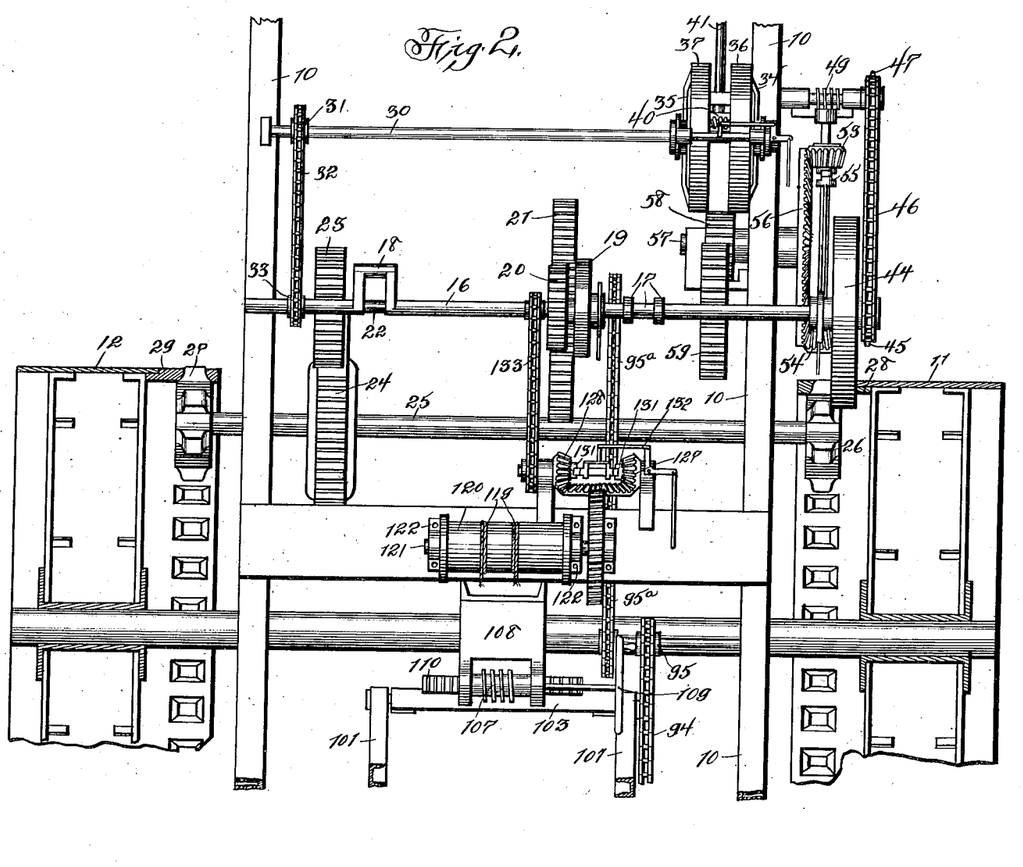
Fig. 2 is a plan, partly in section, of a portion of the machine proper.
Figure 4:
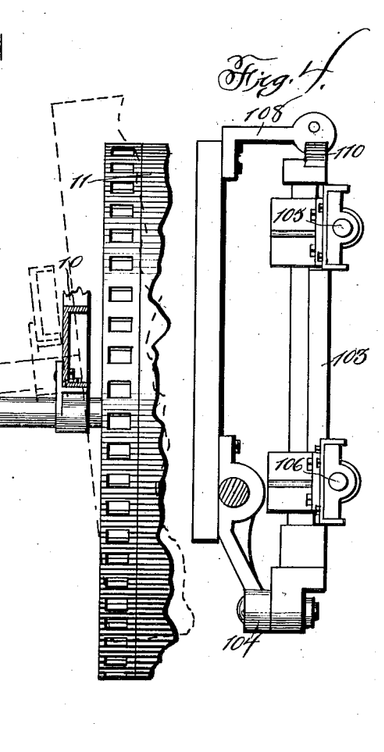
Fig. 4 is a side elevation of the mechanism shown in Fig. 3, with the wheels and frames removed.

As shown in Fig. 2 a shaft 16 is connected with the engines by means of the cranks 17 and 18. A clutch 19 of common form is feathered to the shaft 16 and arranged to engage, at times, the gear wheel 20, loosely mounted on said shaft which gear wheel 20 meshes with the wheel 21 on the shaft 22. A gear wheel 23 on the shaft 22 meshes with the compensating gear 24 on the shaft 25. Toothed wheels 26, 27 are mounted on the shaft 25 and mesh with gear rims 28, 29 fixed to the inner margins of the wheels 11 and 12.

The steering apparatus comprises a shaft 30, having thereon a sprocket wheel 31 embraced by a chain 32 which also embraces a sprocket wheel 33 on the shaft 16. Two clutch-members 34 and 35 are feathered on the shaft 30 and arranged to engage, respectively, the members 36 and 37. Bevel-gears 38 and 39 are formed integral with the members 36 and 37 and mesh with a bevel gear 40 on a shaft 41. Formed on, or fixed to the forward end of the shaft 41 is a worm 42 which engages a segmental worm wheel 43 connected with the front truck.

A second means for moving the machine is provided for when it is desired to advance at slow traction, which means operates in conjunction with reversing mechanism and comprises a friction clutch 44 on the shaft 16 which engages the sprocket wheel 45. A chain 46 embraces the wheel 45 and a wheel 47, which is mounted on a stub shaft 48. Formed on or fixed to the shaft 48 is a worm 49 in mesh with a worm-wheel 50. The wheel 50 is mounted on a shaft 51 supported in bearings 52 fixed to the machine frame. Loosely mounted on the shaft 51 are two bevel gear wheels 53 and 54 arranged to be acted on alternately by clutch mechanism 55 feathered to the shaft. The bevel gears 53 and 54 are in mesh with a bevel wheel 56 mounted on a shaft 57. A gear wheel 58 is mounted on the shaft 57 and meshes with a wheel 59 on the shaft 22. Thus it is obvious forward or rearward motion at slow speed, may be imparted to the traction wheels 11 and 12 through the mechanism just described and the pinions 26 27, shaft 25, compensating gear 24 and the gear wheel 23.

The digging mechanism comprises a frame, preferably constructed of angle iron, in skeleton form, and of substantially triangular shape in side elevation having a rectangular upper, or main, portion, made up of four longitudinal angle irons 60 connected by the vertical risers 61. A bearing 62 is secured to the risers 61 by means of the angle-irons 63 and struts 64 extended forwardly and upwardly connect the bearing 62 to the lower, rearward end of the main frame. The angle irons 63 are provided with a series of holes 65 through which bolts 66 are passed and provide a means for adjusting the frame to various lengths. The struts 64 are also provided with holes 67 and bolts 68 for varying their lengths.

Figure 5:
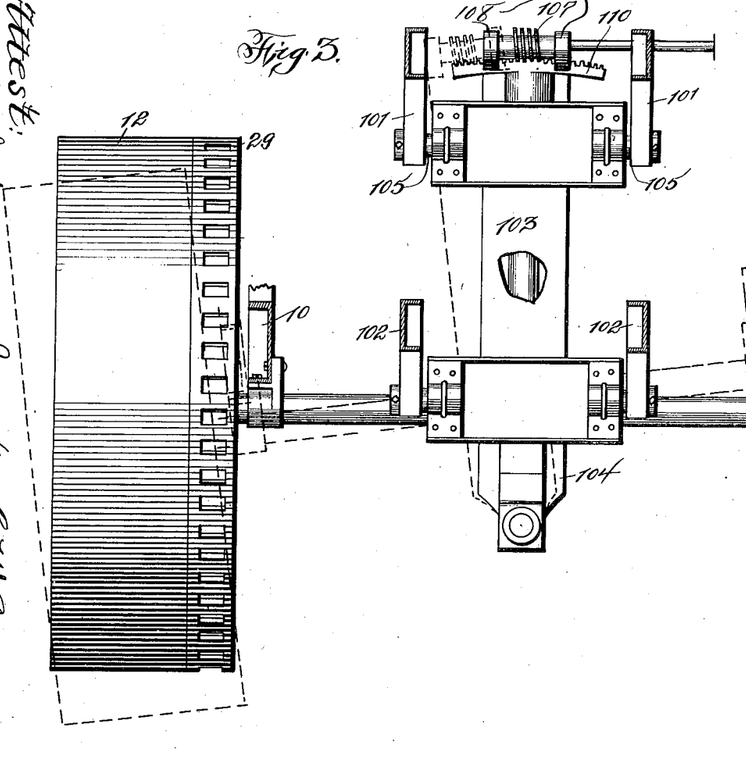
Fig. 5 is an elevation of the lower end of the digger frame with a section of the digger thereon, partly in section.
Figure 6:
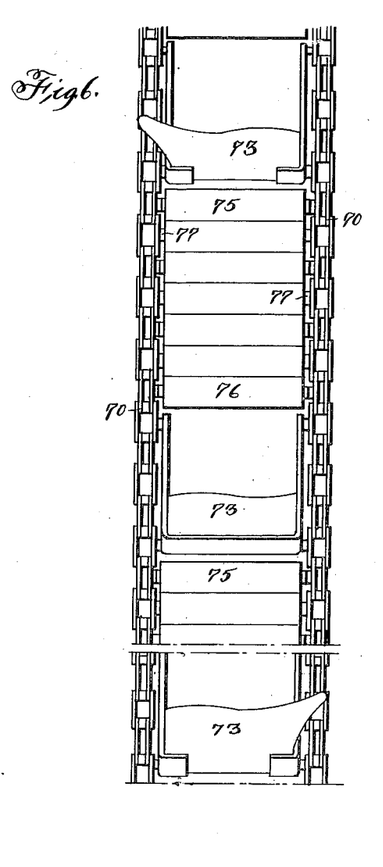
Fig. 6 is a view of the digging mechanism, removed from the frame.
Figure 7:
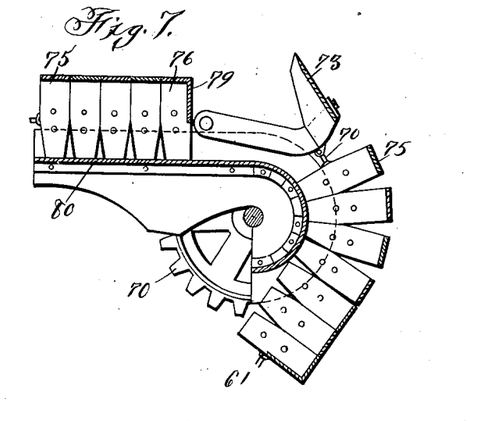
Fig. 7 is a sectional elevation of the upper end of the digging mechanism and frame.

Sprocket wheels 69 are mounted in the bearings 62 and embraced by chain belts 70 which also embrace the sprocket wheels 71 in the forward risers 61 and the sprocket wheels 72 in the rearward risers of the upper frame. Shovels 73 are arranged at intervals between and fixed to the chain belts 70 by means of the links 74. The shovels 73 are formed with oblique projections extending in front of one or the other of belts 70. As shown in Fig. 5 the shovels 73 are arranged to loosen the earth and direct or discharge it into the buckets 75. The buckets 75 are arranged in series between the shovels 73 and are U-shaped and secured to the chains 70 by being riveted to the special links 77 forming parts of said chains. Other buckets 76 are of the same design as the buckets 75 except for the provision of rear walls 79 designed to hold the earth during the upward travel of the chains, and said buckets 76 follow the series of buckets 75 and are spaced a considerable distance from the next following shovel 73. The upper ends of the sides of the buckets are tapered at 78 to permit movement around the sprocket wheels as shown in Figs. 5 and 7.

An apron 80 is secured to the upper frame and is curved at its forward end to conform to the path of travel of the upper ends of the buckets and arranged to hold the earth in the buckets and direct it to a point of discharge.

A trussed frame 81 is secured to the rear ends of the angle irons 60 of the main, upper, frame and arranged to carry a follower or shield 82. The function of which shield is to direct such earth as may be carried on the shovels over the point of discharge to the bottom of the trench from whence it is again carried upwardly by the shovels. Thus the trench is kept at all times free from loose clods of earth.

Figures 14, 15:
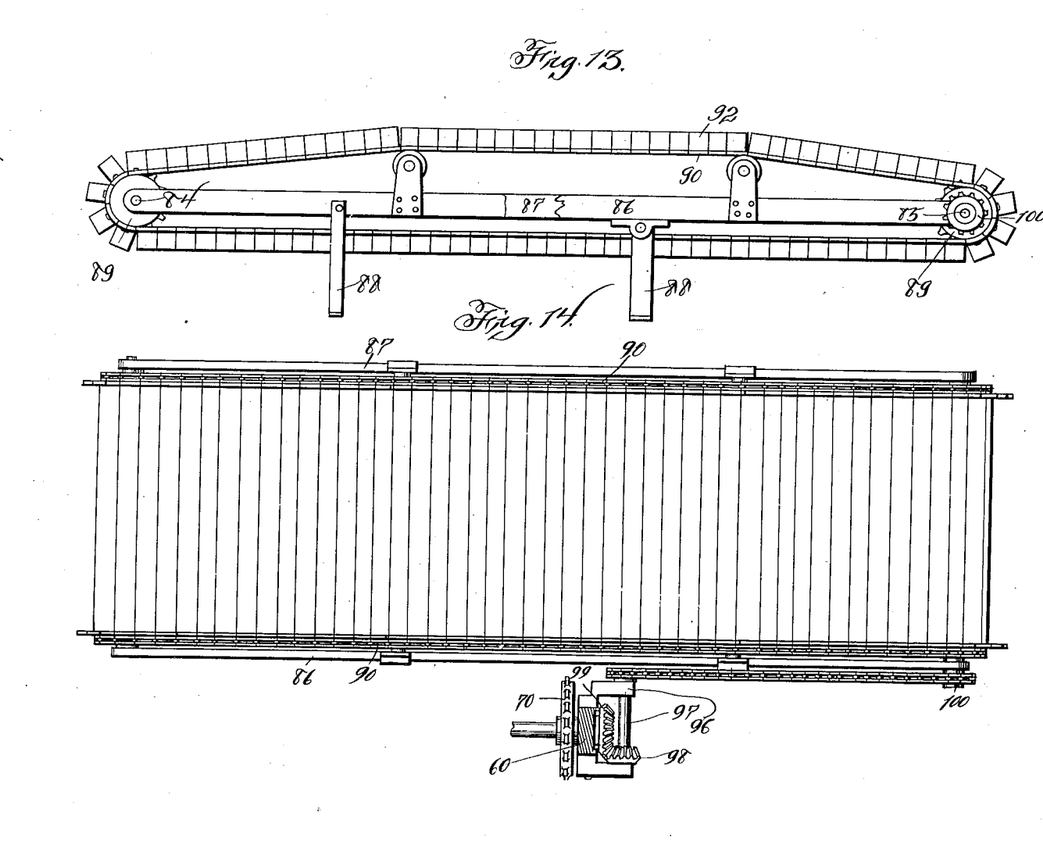
Fig. 14 is a plan of the conveyer and operating parts.
Fig. 15 is a detail view of the means for connecting the front truck to the machine proper.
Figure 15:
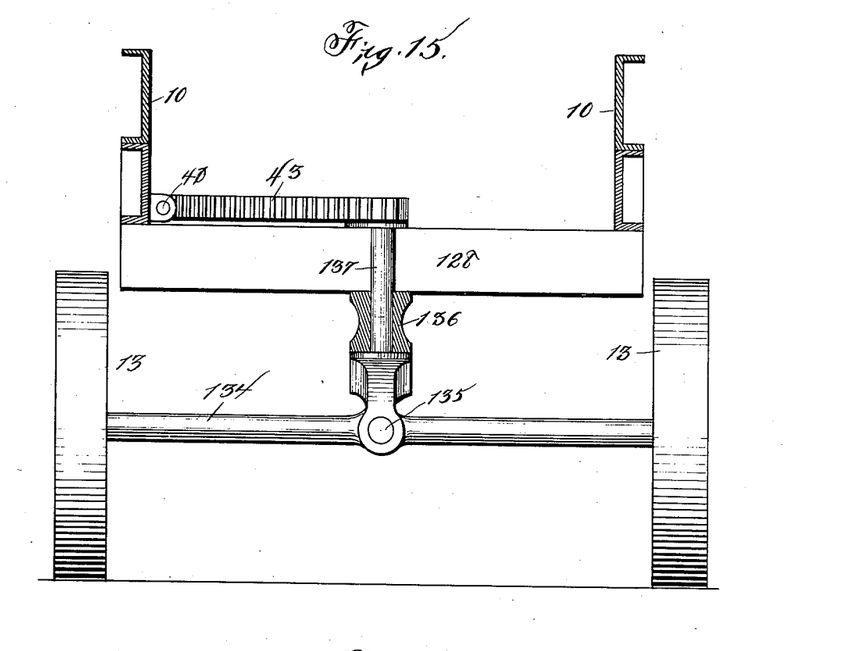
Figure 16:
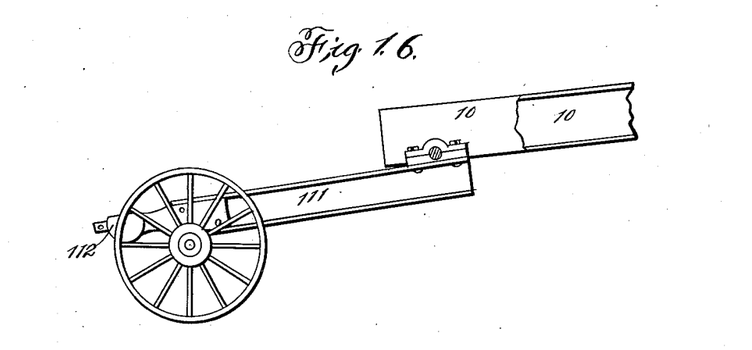
Fig. 16 shows the pivotal connection of the truck for supporting the digger frame with the machine proper.

A conveyer 83 is mounted in the frame of the digger on the longitudinal angle irons 6. As shown in Figs. 13 and 14 shafts 84 and 85 are mounted in the end portions of the bars 86 and 87 which are mounted on and secured to the angle irons 60 by the standards 88. Sprocket wheels 89 are mounted on the shafts 84 and 85 and are embraced by endless chain belts 90. Flat metal plates 91 having upturned ends 92 are secured to and between the chain belts 90. This means provides a strong and durable conveyer for receiving earth from the apron 80 and digger buckets 75 76 and removing it laterally from the machine to discharge.

A sprocket wheel 93 is mounted on the shaft in the forward risers 61 of the digger frame and is embraced by a chain 94 which also embraces a wheel 95 on the frame 10 of the tractor. The wheel 95 is in gear with the shaft 22 by means of the sprocket gear 95$^a$. Fixed in bearings 96 on the angle iron 60 is a shaft 97 having thereon a bevel gear wheel 98 which meshes with a wheel 99 on the shaft that carries the digger chain and sprocket wheel 93. A sprocket wheel on the shaft 97 is in gear with a wheel 100 on the shaft 85 of the endless conveyer.

The digger frame is connected with the frame of the tractor by four angle irons arranged in pairs, the upper pair 101 being pivotally connected with the upper ends of the risers 61 and the lower pair 102 pivotally connected with the lower ends of the risers 61. The lower ends of the angle irons 101 and 102 are pivotally connected with a tilting apparatus, mounted on the rear axle of the tractor (as shown in Fig. 3).

The tilting apparatus comprises a frame 103, arranged to be oscillated laterally, supported in a bearing 104 fixed to the axle of the tractor. Shafts 105 and 106 are supported in the frame 103 to which the angle irons 101 and 102 are journaled. A worm gear 107 supported in bearings 108 on the upper end of the frame 103 arranged to be operated by means of the hand wheel 109 is in mesh with a worm gear 110 formed on, or fixed to the frame 103. This tilting apparatus is provided for, in cases where the machine is operated on uneven surfaces. It being necessary to the greatest efficiency of the digger to maintain it in a vertical position.

Figure 10:
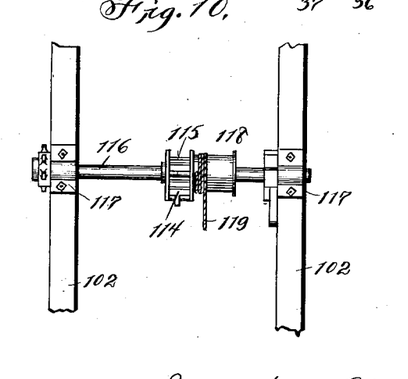
Fig. 10 is a plan of a portion of the means for raising and lowering the digger frame.

A wheeled truck 111, pivotally connected with the rear end of the frame 10 of the tractor, is provided with a socket 112 designed to receive a ball 113 on the lower end of a rack bar 114. The rack bar 114 is provided with flanges and is arranged to mesh with a pinion 115 on a shaft 116 in a bearing 117 on the angle irons 102. The rack bar is held in mesh with the pinion by means of collars arranged on either side of the pinion having lugs which embrace the flanges of the rack bar as shown in Fig. 10.

The truck 111, through the rack bar 114 and pinion 115 is designed to support the digger frame when in working position.

Figure 8:
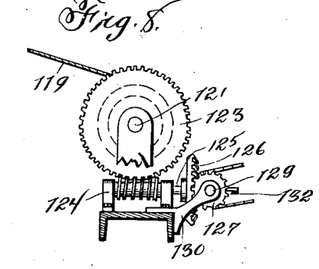
Fig. 8 is an elevation of the drum and gearing for raising and lowering the digger frame.
Figure 9:
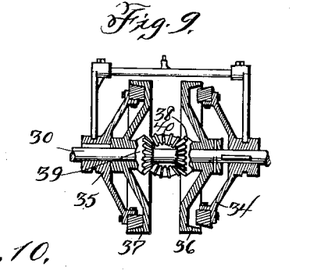
Fig. 9 is a vertical, sectional elevation of the mechanism for reversing the steering gear.

The means for vertically adjusting the digger frame and wheeled support comprises a drum 118 on the shaft 116 and a rope or cable 119. The rope is wound about the drum 118 and a second drum 120 mounted on a shaft 121 in bearings 122 on the tractor frame 10. The shaft 121 upon which the drum 120 is mounted is provided at one end with a worm wheel 123 (Fig. 8) in mesh with a worm 124 on a shaft 125. A bevel wheel 126 is mounted on the shaft 125 and meshes alternately with bevel wheels 127 and 128 supported on a shaft 129 mounted in bearings 130. Each of the wheels 127, 128 is provided with a clutch member 131 adapted to co-act with clutch mechanism 132 keyed to the shaft 129. Motion is imparted to the shaft 129 through sprocket-gearing 133 connected with the engine shaft 16.

Figure 11:
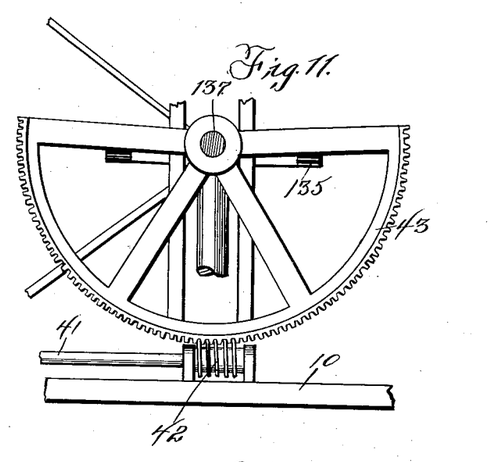
Fig. 11 is a detail plan of the steering apparatus.
Figure 12:
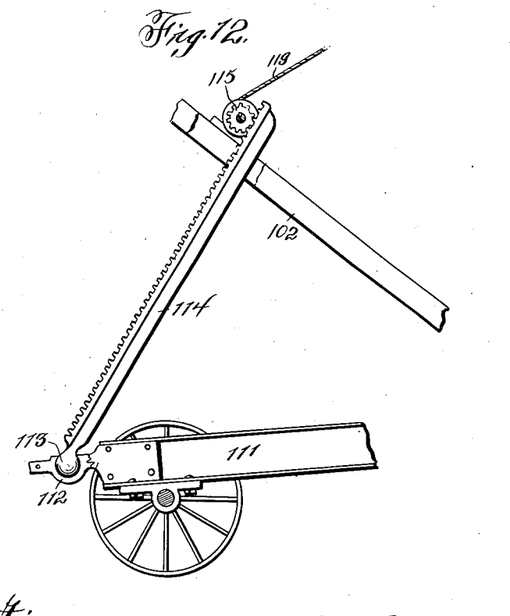
Fig. 12 illustrates a truck for carrying a digger-frame, when in digging position.

A means additional to the tilting apparatus described, for maintaining the digger frame in proper working position, is arranged in connection with the forward wheels 13 of the tractor frame. As shown in Fig. 15 the wheels 13 are mounted on an axle 134, having forwardly and rearwardly projecting stubs 135. To the ends of the stubs 135 is fixed a member 136 having a reduced upper end 137 supported in the frame 10 in the bearing 138. The member 136 and stubs 135 are substantially the same as the ordinary universal-joint. The steering apparatus shown in Fig. 11 is secured to the upper end 137 of the member 136. Thus it is obvious the front truck may be rotated relative to the frame 10, as required to steer the machine and the frame 10 is maintained in a horizontal plane as required to reduce to a minimum lateral motions of the tractor frame.

Having thus described my invention, what I claim as new therein and desire to secure by Letters Patent of the United States therefor, is

1. In a trench excavator, a tractor, digging mechanism carried by the tractor and means for tilting the digging mechanism relative to the tractor.

2. In a trench excavator, a tractor, digging mechanism carried by the tractor, means for tilting the digging mechanism relative to the tractor and means for raising and lowering the digging mechanism.

3. In a trench excavator, a tractor, digging mechanism carried by the tractor, means for tilting the digging mechanism relative to the tractor, means for raising and lowering the digging mechanism and means for supporting same in various positions.

4. In a trench excavator, a tractor, a frame carried by the tractor, digging mechanism supported in the frame and means connecting the tractor and digger frame whereby they may be tilted relative to each other.

5. In a trench excavator, a tractor, a frame, digging mechanism supported in the frame, tilting mechanism arranged to oscillate laterally of the tractor and means for connecting the tractor and frame.

6. In a trench excavator, a tractor, a frame, digging mechanism supported in the frame, tilting mechanism arranged to oscillate laterally of the tractor and arms for connecting the frame and tilting mechanism.

7. In a trench excavator, a tractor, a frame, digging mechanism supported in the frame, tilting mechanism arranged to oscillate laterally of the tractor, arms for connecting the frame and tilting mechanism and means for operating the tilting mechanism.

8. In a trench excavator, a tractor, a frame, digging mechanism supported in the frame, an upright fixed to the tractor, tilting mechanism pivoted to the tractor, arranged to oscillate laterally, means for connecting the upright and tilting mechanism, means for moving the tilting mechanism relative to the upright and means for connecting the digger frame to the tilting mechanism.

9. In a trench excavator, a tractor, an upright fixed to the tractor, a second upright pivoted to the tractor, means for oscillating the second upright relative to the first upright, a digger frame and means for connecting the digger frame with the second upright.

10. In a trench excavator, a tractor, an upright fixed to the tractor, a second upright pivoted to the tractor, a worm wheel carried by the first upright, a rack carried by the second upright, means for operating the worm, a digger frame and means for connecting the digger frame with the second upright.

11. In a trench excavator, a tractor, an upright fixed to the tractor, a second upright pivoted to the tractor, means for oscillating the second upright laterally relative to the first upright, bearings on the second upright, arms supported on the bearings and a digger frame carried by the arms.

12. In a trench excavator, a tractor, an upright fixed to the tractor, a second upright pivoted to the tractor, means for moving the second upright relative to the first upright, shafts carried by the second upright, arms supported by the shafts, a frame carried by the arms and an endless chain digger carried by the frame.

13. In a trench excavator, a tractor, a frame carried by the tractor, means for tilting the frame relative to the tractor, means for raising and lowering the frame, means for supporting the frame at various heights and digging mechanism carried by the frame.

14. In a trench excavator, a tractor, a frame carried by the tractor, means for tilting the frame relative to the tractor, means for raising and lowering the frame, means for supporting the frame at various heights, digging mechanism carried by the frame, and means for receiving earth from the digging mechanism and conveying it away from the machine.

15. In a trench excavator, a tractor, a frame carried by the tractor, endless chains supported in the frame, shovels carried by the chains, buckets carried by the chains to receive earth from the shovels and means for automatically dumping the buckets.

16. In a trench excavator, a tractor, a frame carried by the tractor, endless chains supported in the frame, shovels carried by the chains, buckets in series carried by the chains and means for automatically dumping the buckets.

17. In a trench excavator, a frame, endless chains supported in the frame, sectional buckets carried by the chains and means for dumping the buckets.

18. In a trench excavator, a frame, endless chains supported in the frame, shovels carried by the chains and sectional buckets composed of flat metal strips having upturned ends carried by the chains.

19. In a trench excavator, a frame, chains supported in the frame, sectional buckets carried by the chains composed of flat metal strips having upturned ends and a section of the bucket having upturned ends and closed at its rear.

20. In a trench excavator, a frame, chains supported in the frame, links carried by the chains, shovels fixed to the links and sectional buckets carried by the chains.

21. In a trench excavator, a frame, chains supported in the frame, buckets carried by the chains composed of flat metal strips having upturned, tapered ends.

22. In a trench excavator, a frame, sprocket wheels mounted in the frame, chains to embrace the sprocket wheels, sectional buckets carried by the chains, each section of which comprises a flat bottom and upturned ends, the upturned ends being tapered and provided with means for attachment to the chains.

23. In a trench excavator, a frame, sprocket wheels mounted in the frame, chains embracing the sprocket wheels, shovels and buckets secured to the chains and a follower or shield secured to the frame.

24. In a trench excavator, a frame, sprocket wheels mounted in the frame, chains embracing the sprocket wheels, shovels and buckets carried by the chains, a conveyer carried by the frame, means for automatically dumping the buckets over the conveyer and a follower or shield carried by the frame.

25. In a trench excavator, a frame, wheels mounted in the frame, chains embracing the wheels, shovels and buckets carried by the chains arranged to dig and carry earth upwardly and an apron arranged to receive the earth from the buckets.

26. In a trench excavator, a frame, sprocket wheels mounted in the frame, chains embracing the sprocket wheels, buckets carried by the chains, an apron mounted on the frame to receive earth from the buckets when the same are inverted in passing around one of the sprocket wheels and a conveyer.

27. In a trench excavator, a frame, sprocket wheels mounted in the ends of the frame, chains embracing the sprocket wheels, buckets carried by the chains, means whereby the buckets are dumped upon the apron and means for removing the earth from the apron.

28. In a trench excavator, a frame, sprocket wheels mounted in the frame, chains embracing the sprocket wheels, each chain engaged by three sprocket wheels and thereby arranged to travel in a triangular course, buckets carried by the chains, arranged to carry earth upwardly and discharge when inverted, an apron mounted in the frame, arranged to receive earth from the inverted buckets and direct it to means for discharging the earth from the machine.

29. In a trench excavator, a frame substantially triangular in side elevation, sprocket wheels mounted at the corners of the frame, chains embracing the sprocket wheels, buckets carried by the chains, arranged to carry earth upwardly and discharge when inverted to travel over the horizontal course of their path.

30. In a trench excavator, a frame, wheels mounted in the frame, chains embracing the wheels, buckets carried by the chains, a conveyer mounted on the frame, means to direct the earth carried by the buckets to the conveyer, a shield or follower arranged to follow the buckets in the trench and direct loose earth to the buckets where it is again carried to the conveyer and means for connecting the frame with a tractor.

31. In a trench excavator, a tractor, arms pivoted to the tractor, a digger frame carried by the arms, a shaft mounted in bearings on the arms, a drum and pinion on the shaft, a truck pivoted to the tractor, a rack bar carried by the truck, in mesh with the pinion, and means for rotating the drum and pinion.

32. In a trench excavator, a tractor, arms pivoted to the tractor, a digger frame carried by the arms, a shaft mounted in bearings on the arms, a drum and pinion on the shaft, a truck pivoted to the tractor, a rack bar carried by the truck in mesh with the pinion, a drum on the tractor and a rope or cable arranged to be wound on the drums.

33. In a trench excavator, a tractor, arms pivoted to the tractor, a digger frame carried by the arms, a shaft mounted in bearings on the arms, a drum, pinion and locking device on the shaft, a truck pivoted to the tractor, a rack-bar carried by the truck, in mesh with the pinion, a drum on the tractor, a rope or cable wound about said drums and means for rotating the drum on the tractor.

34. In a trench excavator, a tractor, arms pivoted to the tractor, a digger frame carried by the arms, a shaft mounted in bearings in the arms, a drum, pinion and locking device on the shaft, a truck pivoted to the tractor, a rack-bar pivoted to the truck and in mesh with the pinion, a drum on the tractor, a rope or cable wound about said drums, means for rotating the drum on the tractor and means for reversing the motion of the drum on the tractor.

35. In a trench excavator, a tractor, a digger frame carried by the tractor, means for tilting the digger frame in relation to the tractor, means for altitudinally adjusting the digger frame and changeable speed gears connected with the tractor.

36. In a trench excavator, a tractor, a digger frame carried by the tractor, means for tilting the digger frame in relation to the tractor, means for altitudinally adjusting the digger frame, means for locking the frame in various positions, and changeable speed gears connected with the tractor.

37. In a trench excavator, a tractor, a digger frame carried by the tractor, means for tilting the digger frame in relation to the tractor, means for altitudinally adjusting the digger frame, means for locking the digger frame in various positions, changeable speed gears connected with the tractor and a manually controlled, power operated steering apparatus.

38. In a trench excavator, a tractor, a digger frame carried by the tractor, means for tilting the digger frame in relation to the tractor, means for altitudinally adjusting the digger frame, means for locking the digger frame in various positions, changeable speed gears connected with the tractor, a manually controlled, power operated steering apparatus and means for connecting the tractor frame with the front truck whereby it may tilt relative to the truck.

39. In a trench excavator, a tractor, a digger frame connected with the tractor, means for tilting the digger frame in relation to the tractor, means for altitudinally adjusting the digger frame, means for locking the digger frame in various positions, changeable speed gears connected with the tractor, a manually controlled, power operated steering apparatus and a universal joint connection between the front truck and tractor.

40. In a trench excavator, a tractor frame, a motor carried by said frame, a wheeled truck for supporting the forward end of the frame, a universal joint connecting the truck and frame, a manually controlled, power operated steering apparatus connected with the front truck, a digger frame carried by the tractor frame, means for tilting the digger frame in relation to the tractor frame, means connected with the motor for raising and lowering the digger frame and means for locking the digger frame in various positions.

41. In a trench excavator, a tractor frame, a motor carried on the frame, a wheeled truck for supporting the forward end of the frame, a universal joint connecting the truck and frame, a manually controlled, power operated steering apparatus connected with the front truck, a digger frame carried by the tractor frame, means for tilting the digger frame in relation to the tractor frame, means for raising and lowering the digger frame, means for locking the digger frame in various positions, digging mechanism on the digger frame, a conveyer on the digger frame and changeable speed gear for advancing the tractor frame.

GEORGE W. PARSONS.

In presence of —
   GEO. F. LAMBERT,
   R. G. ORWIG.